F. R. PARKER.
VOLTAIC CELL AND ELECTRODE.
APPLICATION FILED MAY 8, 1916.

1,366,095.

Patented Jan. 18, 1921.

WITNESSES:
Otto Kischel
Theodore E Kischel

INVENTOR
Frederick R. Parker.

UNITED STATES PATENT OFFICE.

FREDERICK R. PARKER, OF CHICAGO, ILLINOIS.

VOLTAIC CELL AND ELECTRODE.

1,366,095.        Specification of Letters Patent.    Patented Jan. 18, 1921.

Application filed May 8, 1916. Serial No. 96,066.

*To all whom it may concern:*

Be it known that I, FREDERICK R. PARKER, a citizen of the United States of America, residing at Chicago, in the county of Cook and State of Illinois, have invented a new and useful Voltaic Cell and Electrode, of which the following is a specification, reference being had to the accompanying drawings, illustrating the preferred form of the invention.

The voltaic cell of this invention is an improvement on the voltaic cells set forth in my United States Letters Patents No. 1,182,202, dated May 9, 1916, and No. 1,333,771, dated March 16, 1920, on voltaic cell and battery the latter patent being a division of the former, both of said patents covering certain features of construction of the present invention. A modified form of the present invention forms the subject-matter of my co-pending United States patent application Serial No. 96,067, on voltaic cell.

My invention relates to voltaic cells and batteries, and to electrodes therefor and for various purposes.

The principal objects of my invention are, to provide an improved voltaic cell as herein set forth; to provide an improved electrode for voltaic cells and for other uses, as herein set forth; to provide an improved method of constructing voltaic cells as herein set forth; and to provide simplicity of construction, cheapness of manufacture, and efficiency, in the devices of this invention. Other objects will be apparent from the present disclosure of this invention.

Figure 1:
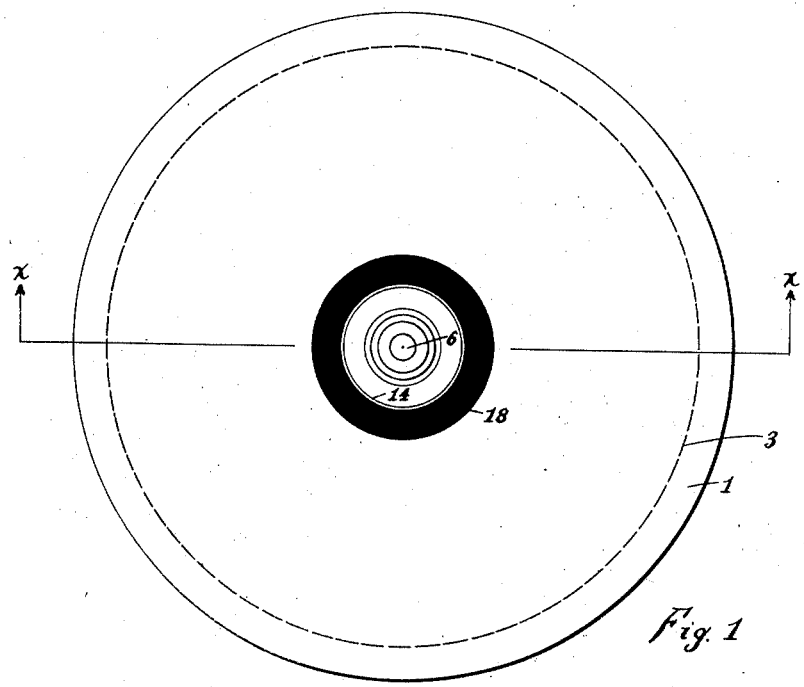
Figure 2:
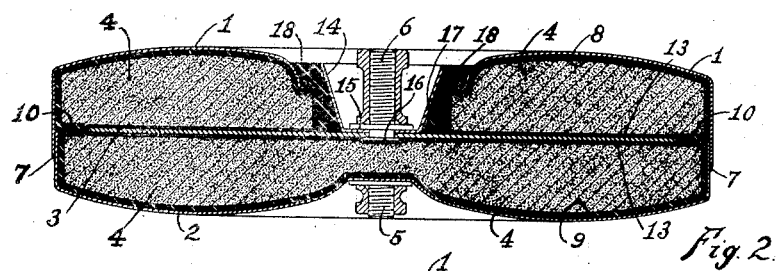
Figure 3:

On the accompanying sheet of drawings illustrating one form of my invention, Figure 1 is a top or plan view of a voltaic cell of the invention, the outline of the inner electrode being shown by a dotted circle; Fig. 2 is a cross-sectional view of the cell of Fig. 1, taken on plane *x—x* of Fig 1, with portions shown in elevation; and Fig. 3 is an enlargement of a portion of Fig. 2, showing the detail of construction of the interior edge of the upper portion of the casing of the cell.

Like characters refer to like parts in the several figures.

In the preferred form of my invention, illustrated in the drawings, the voltaic cell has a two-part casing composed of the saucer-like portions 1 and 2, which casing also serves as an electrode for the cell, a plate-like electrode 3 disposed medially within the casing 1—2, excitant-depolarizer filling material 4 between the electrodes 1—2 and 3, and suitable terminals 5 and 6 for the respective electrodes 1—2 and 3.

In the cell illustrated, the casing 1—2 is preferably zinc, but I may also use other materials for this casing. The portions 1 and 2 of the casing are preferably formed saucer-shaped portions, one fitting into the other preferably as shown. The portions 1 and 2 are soldered together, preferably with a low-melting-point-solder, at 7 around the cell, at the edge of the outer portion 1. The portions 1 and 2 of the casing are preferably lined internally with rather thick porous cardboard or soft paper, or some other porous non-conducting material, 8, 9, to keep the filling material 4 from coming into contact with the electrode 1—2. The outer edges of the portions 8 and 9 are preferably turned inwardly against each other around the cell, as shown at 10, to make a good joint between the portions 8 and 9 at this place. The interior edge of the portion 1 of the casing, where a hole is provided in the casing for the terminal 6 to project out of the cell, is preferably rolled as at 11, Fig. 3, to do away with the sharp edge thereof, the interior edge 12 of the portion 8 being curved around the rolled edge 11 of the portion 1, preferably as shown in Fig. 3. The portions 8 and 9 are preferably pressed into their proper shapes to fit the portions 1 and 2 of the casing, while being manufactured. The portions 8 and 9 may be pressed from paper pulp placed in suitable dies which may be heated if desired. The portions 1 and 2 of the casing are preferably composed of curvilinear portions, preferably as shown, so as to provide curved or concave surfaces adjacent the filling material on the top, the bottom, and the sides of the cell. These curved surfaces are provided so that the casing 1—2 cannot spring, bulge, or buckle away from the filling material 4 of the cell at any portion of the casing, as it might do if it had flat surfaces. The curvilinear portions also make the casing stronger and more rigid. The terminal 5, preferably a screw post with a nut, is preferably soldered to the portion 2 of the casing as shown. This terminal 5 is preferably short and does not project out farther than the confines of the body of the cell.

The excitant-depolarizer filling material 4 may be a mixture of powdered graphite or carbon, or both, with manganese-dioxid, salamoniac, and water, preferably as chemically pure as possible, or other suitable chemical mixtures.

The electrode 3 is preferably the cathode or electro-negative electrode of the cell illustrated. My improved electrode of this invention, which I preferably use for the electrode 3 of the voltaic cell of this invention, comprises, in its preferred form, a metallic portion covered with carbonaceous material impervious to moisture. The metallic portion of the electrode, such as the plate 3 of the voltaic cell illustrated, may be of various shapes and of any suitable metal or alloy of metals, and it may, in some instances, have other suitable material substituted therefor. Its function is, primarily, to form a support for the carbonaceous covering, and preferably a good conductor for same. This metallic portion I may make of copper, brass, aluminum, zinc, bronze, cold-rolled steel, or various other metals. For an electrode of high conductivity I preferably use copper, and for an electrode of great strength and rigidity, together with fair conductivity, I preferably use cold-rolled steel electroplated with copper. The electroplating on the metallic portion of the electrode is of advantage because it presents a rough surface to the carbonaceous covering which holds more securely thereto than to a smooth surface. For the carbonizing covering for the metallic portion of the electrode I use, preferably, a carbonaceous material such as powdered graphite, carbon dust, powdered charcoal which has been well burned, or other carbonaceous materials, mixed with an adhesive non-conducting material which is impervious to moisture and certain chemical solutions. For such an adhesive impervious material I preferably use a good insulating and waterproof varnish or enamel, or a good grade of shellac, or both, or I may use suitable glues, gums, waxes, cements, paraffin, asphaltum, or other materials, or combinations thereof. I preferably mix the carbonaceous material with the adhesive material so as to form a rather thin mixture, and let this mixture stand until every particle of the carbonaceous material is thoroughly penetrated by the adhesive material or a component part thereof so that there will be no possibility of moisture or certain chemical solutions soaking into or through the particles of the carbonaceous material. I may then apply the mixed carbonizing material to the metallic portion of the electrode with a brush, or by dipping, or by spraying it onto the metallic portion.

I may use a carbonizing material which is air-drying, or a material which must be baked after being applied. I may also use one or a number of coats of the carbonizing material on the metallic portion of the electrode. I have found that two coats, and even one coat, gives very satisfactory results. In applying the carbonizing material with a brush or by dipping, it is important to have it free from air bubbles, which, upon breaking, would leave holes in the carbonizing covering. I may also polish or dress down my carbonized surfaces if I desire, to remove the exposed adhesive nonconducting material and present a smoother surface, or a surface of higher conductivity, or both.

I wish it to be understood that my carbonized portions above described may be used for various purposes besides for battery electrodes, such as for lightning-arrester electrodes, circuit-breaker parts, electric generator brushes, resistances, telephone transmitters, diaphragms, and in place of various carbon or graphite parts.

In the voltaic cell illustrated, the carbonizing covering for the metal disk 3 of the electrode is shown at 13. A metallic cup-shaped portion 14 is soldered to the middle of the metallic disk 3 preferably as shown, and the screw post 6 is soldered to the portion 14 at 15. The post 6 also preferably extends through the portions 14 and 3 as shown and is riveted thereto at 16. The outer edges of the metallic disk 3 are preferably rounded off to do away with sharp corners. The carbonizing covering 13 of the electrode 3 extends over the top, bottom and outer edge of the metallic disk 3, over the riveted end of the post 6 at 16, and up around the cup-shaped portion 14 as shown at 17, so that there is no possible chance of the filling material 4, or the moisture or chemical solution contained therein, coming into contact with any metal portion of the electrode member 3. The metal disk 3 provides a good conductor from all portions of the carbonizing covering 13 to the terminal post 6. My carbonized electrode 3 will not break as ordinary carbon will, and it may be made thin enough so as to be somewhat flexible. As my improved electrode 3 does not take up as much space in my voltaic cell as a carbon electrode would which would necessarily be a great deal thicker, I am enabled, by the use of my improved carbonized electrode 3, to make my voltaic cell considerably thinner than otherwise. Furthermore, with my improved carbonized electrode 3 in my voltaic cell, there is no possible chance of the electrolyte in the filling material 4 soaking its way to the terminal post 6 and thereby setting up a detrimental chemical action in the cell, as may be the case with voltaic cells in which a terminal post is connected directly to the ordinary carbon electrode.

I prefer graphite to carbon, as a carbonizing material for my electrode 3, because it is not as porous as carbon, is a better conductor of electricity, and forms a smoother and more compact covering. The graphite may also be more readily dressed down or polished than carbon. When I use graphite as the carbonizing material for my electrode 3, I also preferably use graphite in the filling material 4 of the cell. This use of graphite in my voltaic cell, together with my improved electrode 3 of higher conductivity than a carbon electrode, and the large extent of surface of the electrode 1—2, provides a voltaic cell of very low internal resistance and consequently a cell of very high amperage. With such a cell weighing about three-fourths as much as the standard No. 6 dry cell, I have gotten more than fifty amperes of current on short-circuit, as against a maximum of thirty-three amperes on short-circuit of a No. 6 dry cell on a test of a number of No. 6 cells. With my improved voltaic cell, having such a low internal resistance, the wattage loss in the cell on usage is considerably less than in the ordinary No. 6 dry cells, and consequently the wattage supplied to the external circuit is greater with my cell, and this with a cell much lighter in weight than the ordinary. I can, of course, increase the internal resistance of my cell if this is desired, in manners well understood.

The long terminal post 6 with the long nut thereon is provided on my cells for the purpose of connecting two or more of the cells together to form a battery, as set forth in my above-mentioned United States Letters Patent No. 1,182,202, dated May 9, 1916, on voltaic cell and battery.

18 is an adhesive insulating sealing material, such as pitch and glue, or some other suitable material or compound, which is poured around the cup-shaped portion 14 preferably as shown, so as to tightly seal the cell between the portion 14 and the casing 1. This sealing material 18 preferably covers the rolled edge of the casing 1, shown at 11 in Fig. 3, so as to give the cell a finished appearance at this part and firmly hold the parts in their proper relative positions.

The process of manufacturing my improved voltaic cell from its component parts consists of the following:—

First, the terminal 5 is preferably soldered to the portion 2 of the casing as shown. The terminal 6 has already been attached to the electrode 3 and the cup-shaped portion 14, in the manufacture of the electrode 3 as above set forth. Then the two saucer-shaped portions 1 and 2 of the casing of the cell are placed on a table with the rims thereof projecting upwardly, and the pressed pulp-board linings 8 and 9 are placed therein, respectively. Then each of the saucer-shaped portions 1 and 2 is filled to the proper depth with the moist excitant-depolarizer material 4, preferably with the aid of a filling machine. Then the complete electrode 3 is placed on the top of the material 4 in the portion 1 of the casing, the terminal 6 and the cup-shaped portion 14 projecting through the central opening in the portion 1. Then the exterior edges of the pulp-board linings 8 and 9 are turned over inwardly over the material 4 as shown at 10. Then the two halves of the cell are placed together as shown in Fig. 2 of the drawings, the rim of the portion 2 of the casing slipping into the portion 1 of the casing preferably as shown. Then the cell as a whole is put into a press and the halves thereof are pressed together the required amount to properly compress the filling material 4 and reduce the internal resistance of the cell to the required value, the internal resistance of the cell being measured as the pressure is applied. Then when the cell is compressed the required amount the portions 1 and 2 of the casing are soldered together, at 7 clear around the cell, while the cell is held under the required pressure. Then, finally, the cell is set upright and the sealing material 18 is heated and poured into place around the cup-shaped portion 14 as shown. During the manufacture of the cell I preferably insert a hollow cylindrical portion of insulating material into the central opening in the portion 1 of the casing, far enough to hold the inner wall of the filling material 4 in the portion 1 in place, the cup-shaped portion 14 with its terminal 6 extending into this hollow cylindrical portion when the electrode 3 is put in place on the half 1 of the cell. This hollow cylindrical portion also serves as a guide to center the electrode 3 on the material 4 in the portion 1 of the casing.

By the process described immediately above, the cells may be very readily and easily manufactured, and may be made exceedingly uniform in resistance and electrical output. My cells, constructed in this manner, are very rigid and substantial and are not easily damanged in handling.

Electrical conductors may be connected with the terminal posts 5 and 6 of the cell, under the nuts thereof in a manner well understood. If desired I may do away with riveting the inner end of the post 6 as at 16 and cut off the end 16 of the post and simply set the post 6 into the cup-shaped portion 14 and solder the portions 6, 14 and 3 together.

A portion of the process of constructing my voltaic cells, forms the subject-matter of my co-pending United States patent application Serial No. 432,027, filed Dec. 20, 1920, on Process of Producing Voltaic Cells, which is a division of the present application.

The improved high-potential electricity arrester electrodes mentioned in this application, form the subject-matter of my co-pending United States patent application Serial No. 434,414, filed Jan. 3, 1921, on High-Potential Electricity Arrester Electrode, which is a division of the present application.

The design of the voltaic cell illustrated in this application, forms the subject-matter of my co-pending United States design application Serial No. 427,630, filed Dec. 1, 1920, for Design for Voltaic Cells.

I wish it to be understood that I do not desire to limit this invention to the particular details of construction, nor to the particular materials, herein set forth, as various modifications thereof may be made or utilized without departing from the scope of the appended claims. I also wish it to be understood that the several features of this invention may be used either singly or collectively without departing from the scope of the appended claims.

What I claim herein as my invention is:

1. A battery electrode comprising a metallic portion having a covering of carbonaceous material, an open cup-shaped portion attached to the electrode, and a terminal member for the electrode carried within the said cup-shaped portion.

2. A disk-shaped battery electrode having a separate open cup-shaped portion attached thereto at the center thereof, and a terminal member for the electrode carried within the said cup-shaped portion.

3. A plate-like battery electrode having a separate open cup-shaped portion attached thereto, and a terminal member for the electrode carried within the said cup-shaped portion.

4. A voltaic cell having an electrode forming a casing for the contents of the cell, an electrode disposed medially within the said casing, excitant material within the said casing between the said electrodes, a cup-shaped portion attached to the said medially-disposed electrode, a terminal member for the said medially-disposed electrode carried within the said cup-shaped portion, the said cup-shaped portion being located within the confines of the said casing and opening out of the cell where an opening is provided in the said casing, and insulating material sealing the opening in the cell around the said cup-shaped portion.

5. A voltaic cell having an exterior electrode and an interior electrode, a cup-shaped portion attached to the said interior electrode, located within the confines of the exterior electrode and opening out of the cell, a terminal member for the said interior electrode carried within the said cup-shaped portion, and material sealing the cell around the said cup-shaped portion.

6. A voltaic cell having an exterior electrode and an interior electrode, a cup-shaped portion carried by the said interior electrode, located within the confines of the exterior electrode and opening out of the cell, and a terminal member for the said interior electrode carried within the said cup-shaped portion.

7. A voltaic cell having an electrode forming a casing for the contents of the cell, the said casing comprising telescoping halves having direct electrical connection with each other.

8. A voltaic cell having an electrode forming a casing for the contents of the cell, the said casing comprising telescoping halves electrically connected with each other and secured together to hold the contents of the cell under pressure.

9. A valtaic cell having an electrode forming a casing for the contents of the cell, the said casing being composed of separate halves having direct electrical connection with each other.

10. A voltaic cell having an electrode forming a casing for the contents of the cell, the said casing being composed of separate halves electrically connected with each other and secured together to hold the contents of the cell under pressure.

11. A voltaic cell having an electrode forming a container for the contents of the cell, another electrode within the said container, and excitant material filling the container between the electrodes, the container presenting concave surfaces to the filling material on all faces of the cell whereby the container is kept from bulging away from the filling material.

12. A voltaic cell having an electrode forming a container for the contents of the cell, another electrode within the said container, and excitant material filling the container between the electrodes, the container presenting concave surfaces to the filling material on the top and bottom of the cell whereby the container is kept from bulging away from the filling material at these portions of the cell.

13. A voltaic cell having a container for the contents of the cell, and filling material filling the container, the container presenting curved surfaces to the filling material on all faces of the cell whereby the container is maintained in close relation to the filling material.

14. A voltaic cell having a container for the contents of the cell, and filling material filling the container, the container presenting curved surfaces to the filling material on the top and bottom of the cell whereby the container is maintained in close relation to the filling material at these portions of the cell.

15. A battery electrode comprising a portion of sheet steel electroplated with copper and having a covering comprising a mixture of carbonaceous material and adhesive non-conducting material impervious to moisture.

16. An article of manufacture for various purposes, comprising a conducting portion electroplated with metal and having a covering of carbonaceous material.

17. A battery electrode comprising a metallic portion having a covering comprising a mixture of carbonaceous material and adhesive non-conducting material impervious to moisture, the exposed surface of the said covering being polished.

18. An article of manufacture for electrical purposes, comprising a metallic portion having a covering comprising a mixture of carbonaceous material and adhesive non-conducting material, the exposed surface of the said covering being dressed down to remove the exterior of the said non-conducting material.

19. An article of manufacture for various purposes, comprising a metallic portion having a covering comprising a mixture of carbonaceous material and adhesive material, the exposed surface of the said covering being dressed down whereby the exterior of the said adhesive material is removed.

As inventor of the foregoing I hereunto subscribe my name this 6th day of May, 1916.

FREDERICK R. PARKER.

Witnesses:
OTTO KISCHEL,
THEODORE E. KISCHEL.